United States Patent
Ozaki et al.

(10) Patent No.: US 12,018,895 B2
(45) Date of Patent: Jun. 25, 2024

(54) SUPERCOOLING RELEASE DEVICE, HEAT STORAGE DEVICE AND POWER UNIT

(71) Applicant: Panasonic Corporation, Osaka (JP)

(72) Inventors: Ryuichi Ozaki, Osaka (JP); Kou Sugano, Osaka (JP); Tatsuya Nakamura, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 244 days.

(21) Appl. No.: 17/440,588

(22) PCT Filed: Feb. 7, 2020

(86) PCT No.: PCT/JP2020/004971
§ 371 (c)(1),
(2) Date: Sep. 17, 2021

(87) PCT Pub. No.: WO2020/189089
PCT Pub. Date: Sep. 24, 2020

(65) Prior Publication Data
US 2022/0187029 A1 Jun. 16, 2022

(30) Foreign Application Priority Data
Mar. 20, 2019 (JP) .................... 2019-053121

(51) Int. Cl.
*F28D 20/00* (2006.01)
*F28D 20/02* (2006.01)
(52) U.S. Cl.
CPC ................. *F28D 20/028* (2013.01)

(58) Field of Classification Search
CPC .......................... F28D 20/02; F28D 20/028
See application file for complete search history.

(56) References Cited

U.S. PATENT DOCUMENTS

| 4,379,448 A | 4/1983 | Kapralis et al. |
| 4,860,729 A | 8/1989 | Benson et al. |
| 2008/0135006 A1 | 6/2008 | Shikida |

FOREIGN PATENT DOCUMENTS

| JP | S64-046582 A | 2/1989 | |
| JP | H101-274803 A | 11/1989 | |
| JP | H02-042045 U | 3/1990 | |
| JP | H03-096335 U | 10/1991 | |
| JP | 2010-105570 A | 5/2010 | |
| JP | 2013257080 A | * 12/2013 | ............ F28D 20/02 |

(Continued)

OTHER PUBLICATIONS

International Search Report and Written Opinion issued in International Patent Application No. PCT/JP2020/004971, mailed on Apirl 7, 2020; with partial English translation.

*Primary Examiner* — Eric S Ruppert
(74) *Attorney, Agent, or Firm* — Rimon P.C.

(57) ABSTRACT

A supercooling release device releases a supercooled state of a heat storage material. The supercooling release device includes a first member having a concave portion on a surface and a second member facing the surface and covering the concave portion. The second member can be for example brought into close contact with the first member. The supercooling release device for example applies a load to at least one of the first member and the second member to bring the first member and the second member into close contact with each other.

18 Claims, 14 Drawing Sheets

(56) References Cited

FOREIGN PATENT DOCUMENTS

| | | |
|---|---|---|
| JP | 2014-009818 A | 1/2014 |
| JP | 2015-102288 A | 6/2015 |
| JP | 2015-158306 A | 9/2015 |
| JP | 2018-146173 A | 9/2018 |
| WO | 2007/023795 A1 | 3/2007 |

* cited by examiner

SUPERCOOLING RELEASE DEVICE, HEAT STORAGE DEVICE AND POWER UNIT

CROSS-REFERENCE OF RELATED APPLICATIONS

This application is the U.S. National Phase under 35 U.S.C. § 371 of International Patent Application No. PCT/JP2020/004971, filed on Feb. 7, 2020, which in turn claims the benefit of Japanese Application No. 2019-053121, filed on Mar. 20, 2019, the entire disclosures of which Applications are incorporated by reference herein.

TECHNICAL FIELD

The present disclosure relates to a supercooling release device, a heat storage device, and a power device.

BACKGROUND ART

Heat storage devices have been conventionally known according to which heat storage and heat release are performed by phase transition of a heat storage material between a liquid phase and a solid phase. Such a heat storage device includes a supercooling release device releasing a supercooled state of a supercooled heat storage material. The heat storage device, which includes the supercooling release device, is used for example in a power device including a powertrain such as a gasoline engine or an electric motor.

Patent Literature 1 describes a heat storage device crystallizing a heat storage material in a supercooled state by applying an electrical stimulus to the heat storage material.

Patent Literature 2 describes a nucleating device crystallizing a heat storage material in a supercooled state by utilizing deformation movement of a flexible plate member. The plate member is provided with a groove. Inside the groove, an anhydride of a salt hydrate that is a main component of the heat storage material is disposed.

CITATION LIST

Patent Literature

Patent Literature 1: JP 2018-146173 A
Patent Literature 2: JP 2015-102288 A

SUMMARY OF INVENTION

Technical Problem

Conventional supercooling release devices sometimes cannot release a supercooled state of a heat storage material.

The present disclosure provides a highly-reliable supercooling release device capable of releasing a supercooled state of a heat storage material with a high probability.

Solution to Problem

A supercooling release device according to one aspect of the present disclosure is a supercooling release device that releases a supercooled state of a heat storage material, the supercooling release device including:
 a first member having a concave portion on a surface thereof and
 a second member facing the surface and covering the concave portion.

Advantageous Effects of Invention

According to the present disclosure, it is possible to provide a highly-reliable supercooling release device capable of releasing a supercooled state of a heat storage material with a high probability.

Figure 1:
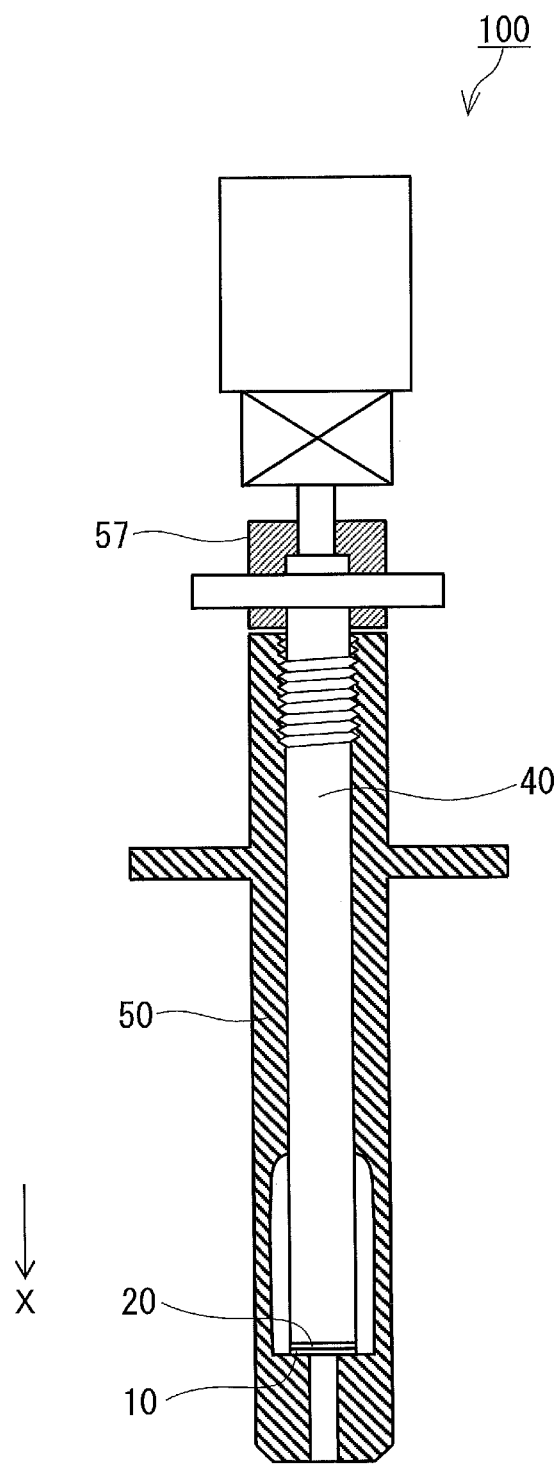
FIG. 1 is a schematic cross-sectional view of a supercooling release device according to Embodiment 1 of the present disclosure.

DESCRIPTION OF EMBODIMENTS (Findings on which the Present Disclosure is Based)
 In the case where a heat storage material is heated for heat storage, the temperature of the heat storage material may greatly exceed the melting point of the heat storage material. The heat storage material may be heated to for example a temperature higher than the melting point of the heat storage material by 40° C. or more. Conventional supercooling release devices sometimes cannot release a supercooled state of a heat storage material that is cooled after being heated to a high temperature.

A supercooling release device according to a first aspect of the present disclosure is a supercooling release device that releases a supercooled state of a heat storage material, the supercooling release device including:
 a first member having a concave portion on a surface thereof, and
 a second member facing the surface and covering the concave portion.

According to the first aspect, when the supercooling release device is brought into contact with a heat storage material in a supercooled state, this stimulation causes crystallization of the heat storage material to proceed. Thus, crystals of the heat storage material are housed in the concave portion of the first member. Since the concave portion is covered with the second member, a portion of the heat storage material present in the concave portion remains as crystals in the concave portion even after the heat storage material is heated. When the second member is moved away from the surface of the first member while the heat storage material is in the supercooled state, the heat storage material in the supercooled state enters the concave portion to come into contact with the crystals of the heat storage material remaining in the concave portion. This releases the supercooled state of the heat storage material thus to solidify the heat storage material. The supercooling release device can release the supercooled state of the heat storage material with a high probability.

In a second aspect of the present disclosure, for example, in the supercooling release device according to the first aspect, the second member may be configured to be brought into close contact with the first member. According to the second aspect, the supercooling release device can release the supercooled state of the heat storage material with a high probability.

In a third aspect of the present disclosure, for example, in the supercooling release device according to the first or second aspect, a load may be applied to at least one of the first member and the second member to bring the first member and the second member into close contact with each other. According to the third aspect, reproducibility of operations of the supercooling release device is improved.

In a fourth aspect of the present disclosure, for example, in the supercooling release device according to any one of the first to third aspects, the surface of the first member may be a flat surface, the second member may have a flat surface facing the surface of the first member, and when the flat surface of the first member is brought into surface contact with the flat surface of the second member, the concave portion of the first member may be covered with the second member. According to the fourth aspect, the supercooling release device can release the supercooled state of the heat storage material with a high probability.

In a fifth aspect of the present disclosure, for example, in the supercooling release device according to any one of the first to fourth aspects, the concave portion may have a groove shape, and one edge face of the concave portion may be exposed outside the first member. According to the fifth aspect, when the second member is moved away from the surface of the first member while the heat storage material is in the supercooled state, the heat storage material in the supercooled state quickly enters the concave portion. Thus, the supercooling release device can quickly release the supercooled state of the heat storage material.

In a sixth aspect of the present disclosure, for example, in the supercooling release device according to the fifth aspect, another edge face of the concave portion may be exposed outside the first member. According to the sixth aspect, the supercooling release device can more quickly release the supercooled state of the heat storage material.

In a seventh aspect of the present disclosure, for example, in the supercooling release device according to the fifth or sixth aspect, the first member may have a through hole extending in a thickness direction thereof, and another edge face of the concave portion may be exposed outside the first member through the through hole. According to the seventh aspect, the supercooling release device can easily release the supercooled state of the heat storage material.

In an eighth aspect of the present disclosure, for example, in the supercooling release device according to any one of the first to seventh aspects, when the supercooled state is to be maintained, the second member may cover the concave portion of the first member to restrict contact between a portion of the heat storage material held in the concave portion and a portion of the heat storage material present outside the concave portion, and when the supercooled state is to be released, the second member may displace relative to the first member to allow contact between the portion of the heat storage material held in the concave portion and the portion of the heat storage material present outside the concave portion. According to the eighth aspect, the supercooling release device can release the supercooled state of the heat storage material with a high probability.

In a ninth aspect of the present disclosure, for example, the supercooling release device according to any one of the first to eighth aspects may further include an elastically deformable third member, wherein the second member may be positioned between the first member and the third member, or the first member may be positioned between the second member and the third member. According to the ninth aspect, the third member elastically deforms by, for example, being compressed while being in contact with the first member or the second member. The elastically deformed third member can uniformly apply a load to the first member or the second member. This allows the second member to be easily brought into close contact with the surface of the first member. Thus, when the heat storage material is heated, the portion of the heat storage material housed in the concave portion tends to remain in the concave portion as crystals. Since the portion of the heat storage material tends to remain in the concave portion as crystals, the supercooling release device can release the supercooled state of the heat storage material with a higher probability.

In a tenth aspect of the present disclosure, for example, the supercooling release device according to any one of the first to ninth aspects may further include a piston having a surface facing the first member or the second member and configured to apply a load to at least one of the first member and the second member. According to the tenth aspect, a load can be applied to at least one of the first member and the second member by the piston. This allows the first member and the second member to be brought into close contact with each other. According to the piston, the reproducibility of the operations of the supercooling release device is improved.

In an eleventh aspect of the present disclosure, for example, the supercooling release device according to the tenth aspect may further include an actuator connected to the piston and configured to displace the piston in a direction to the first member or the second member and in a direction away from the first member or the second member. According to the eleventh aspect, the piston can be displaced by the actuator. Thus, a load can be applied to at least one of the first member and the second member.

In a twelfth aspect of the present disclosure, for example, the supercooling release device according to any one of the first to eleventh aspects may further include a cylinder housing the first member and the second member. According to the twelfth aspect, the reproducibility of the operations of the supercooling release device is improved.

A heat storage device according to a thirteenth aspect of the present disclosure includes:

the supercooling release device according to any one of the first to twelfth aspects;

a heat storage material including at least one selected from the group consisting of a salt hydrate, a sugar alcohol, and a clathrate hydrate; and a container housing the heat storage material.

According to the thirteenth aspect, the heat storage device can release the supercooled state of the heat storage material with a high probability. Thus, the heat storage material can be caused to release heat at a desired time.

A power device according to a fourteenth aspect of the present disclosure includes: the heat storage device according to the thirteenth aspect; and a powertrain configured to receive heat released from the heat storage device.

According to the fourteenth aspect, the powertrain can reduce fuel consumption or power consumption during a warm-up operation.

Embodiments of the present disclosure will be described below with reference to the drawings. The following embodiments are only illustrative, and the present disclosure is not limited to the following embodiments.

Embodiment 1

FIG. 1 is a schematic cross-sectional view of a supercooling release device 100 of Embodiment 1. As shown in FIG. 1, the supercooling release device 100 includes a first member 10 and a second member 20. In the present embodiment, a direction X refers to a direction from the second member 20 to the first member 10. In the supercooling release device 100, crystals of a heat storage material can be housed between the first member 10 and the second member 20. By bringing the second member 20 into close contact with the first member 10 while holding the crystals of the heat storage material between the first member 10 and the second member 20, entry of a liquid portion of the heat storage material between the first member 10 and the second member 20 is restricted. This easily remains the crystals of the heat storage material between the first member 10 and the second member 20 even after a heat storage process for storing heat in the heat storage material. Through the heat storage process, the heat storage material stores heat by maintaining in a liquid phase and a supercooled state. Restriction on entry of the liquid portion of the heat storage material between the first member 10 and the second member 20 maintains the heat storage material in the supercooled state. When the second member 20 is moved away from a surface of the first member 10 while the heat storage material is supercooled, the heat storage material in the supercooled state comes into contact with the crystals of the heat storage material remaining between the first member 10 and the second member 20. This releases the supercooled state of the heat storage material thus to solidify the heat storage material.

Figure 2:
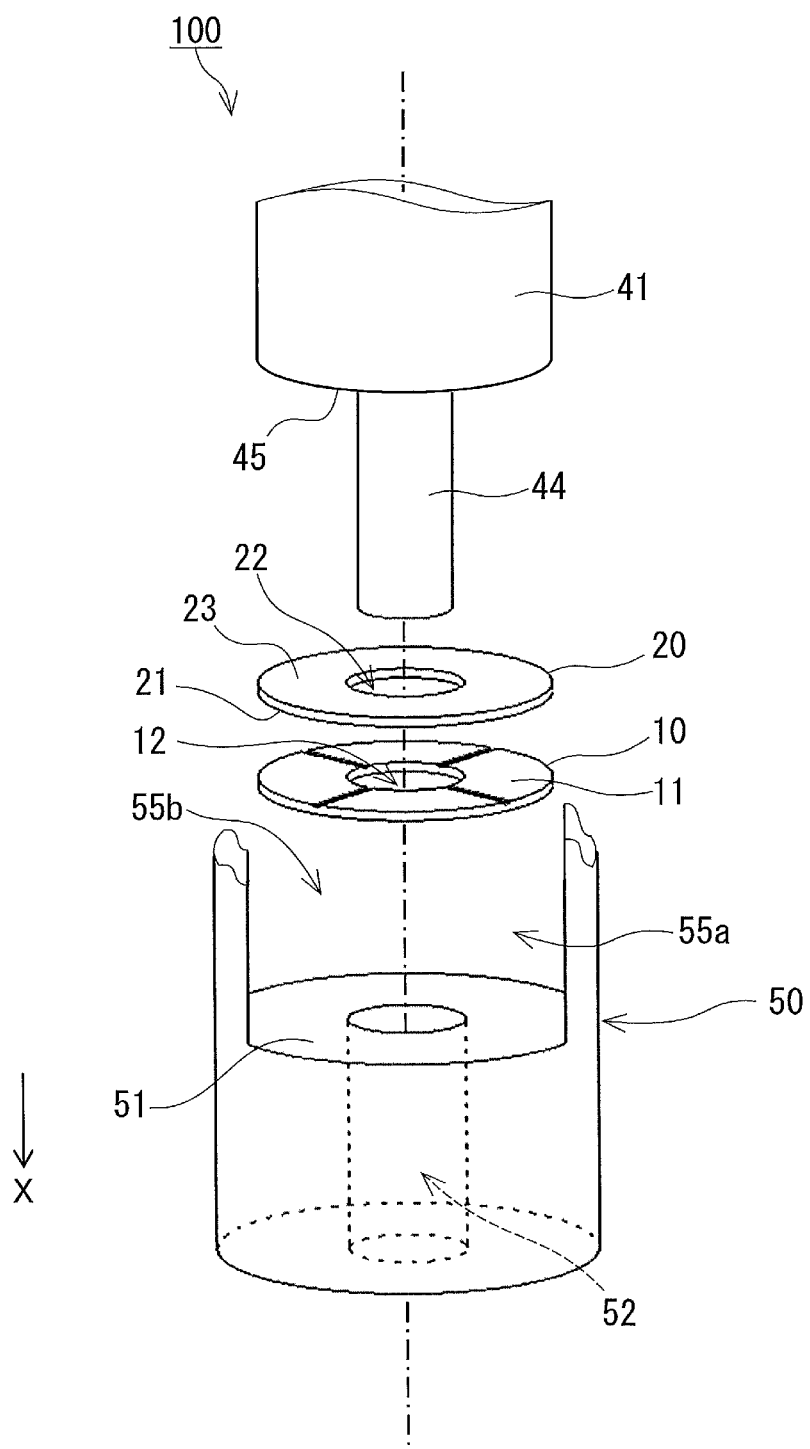
FIG. 2 is an exploded perspective view showing a portion of the supercooling release device shown in FIG. 1.
Figure 3:
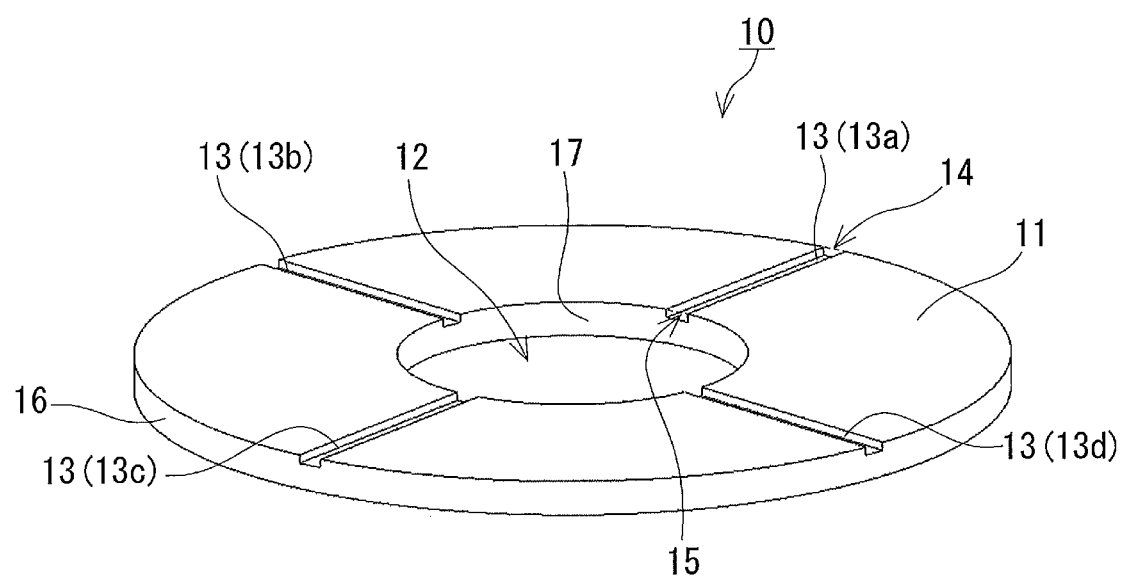
FIG. 3 is a perspective view of a first member included in the supercooling release device shown in FIG. 1.

FIG. 2 is an exploded perspective view showing a portion of the supercooling release device 100. FIG. 3 is a perspective view of the first member 10. As shown in FIGS. 1 to 3, the first member 10 is for example plate-shaped. The first member 10 is for example circular in plan view. The first member 10 may be rectangular in plan view.

As shown in FIG. 3, the first member 10 has a concave portion 13 on its surface 11. The concave portion 13 is formed on the surface 11 of the first member 10. The surface 11 is for example a main surface of the first member 10 and a surface having the widest area of the first member 10. The surface 11 is for example a flat surface. The concave portion 13 for example has a groove shape. The concave portion 13 extends in a direction orthogonal to a thickness direction of the first member 10. The concave portion 13 may have a rectangular, V-shaped, or U-shaped cross section orthogonal to the direction in which the concave portion 13 extends.

One edge face 14 of the concave portion 13 is exposed outside the first member 10. Specifically, the one edge face 14 of the concave portion 13 is exposed outside the first member 10 through an outer circumferential surface 16 of the first member 10. The one edge face 14 of the concave portion 13 is positioned at an end portion of the surface 11. The other edge face 15 of the concave portion 13 is also exposed outside the first member 10. In FIG. 3, the other edge face 15 of the concave portion 13 is exposed outside the first member 10 through a through hole 12 described later. The concave portion 13 extends from the outer circumferential surface 16 of the first member 10 to an inner circumferential surface 17 of the first member 10 defined by the through hole 12. The concave portion 13 may extend straight from the outer circumferential surface 16 to the inner circumferential surface 17.

The first member 10 may have a plurality of the concave portions 13. The number of the concave portions 13 is not particularly limited, and is for example 1 or more and 30 or less. In the present embodiment, the first member 10 has a plurality of concave portions 13a, 13b, 13c, and 13d. The concave portions 13a, 13b, 13c, and 13d are arranged along a circumferential direction of a virtual circle defined by the outer circumferential surface 16. The concave portions 13a, 13b, 13c, and 13d may be arranged at equal intervals along the above circumferential direction. The concave portions 13a, 13b, 13c, and 13d are independent from each other.

The maximum value of the width of the concave portion 13 of the first member 10 is not particularly limited, and is for example 5 μm or more and 200 μm or less. The maximum value of the width of the concave portion 13 may be 30 μm or more, or 100 μm or more. In the present description, the term "the width of the concave portion 13" means the width of the cross section of the concave portion 13 orthogonal to the direction in which the concave portion 13 extends. The maximum value of the length of the concave portion 13 is not particularly limited, and is for example 1 mm or more and 4 mm or less. The maximum value of the depth of the concave portion 13 is not particularly limited, and is for example 5 μm or more and 200 μm or less. The maximum value of the depth of the concave portion 13 may be 10 μm or more. The maximum value of the area of the cross section of the concave portion 13 orthogonal to the direction in which the concave portion 13 extends is not particularly limited, and is for example 120 μm$^2$ or more and 24,000 μm$^2$ or less.

The first member 10 has the through hole 12. The through hole 12 extends in the thickness direction of the first member 10. The through hole 12 is for example circular in plan view. The through hole 12 is positioned for example around the center of gravity of the surface 11 of the first member 10. The center of the virtual circle defined by the outer circumferential surface 16 of the first member 10 may coincide with the center of a virtual circle defined by the inner circumferential surface 17 of the first member 10. The first member 10 is ring-shaped in plan view due to the through hole 12. The through hole 12 has a diameter of for example 1 mm or more and 5 mm or less.

As shown in FIGS. 1 and 2, the second member 20 is for example plate-shaped. The second member 20 is for example circular in plan view. The second member 20 may be rectangular in plan view. The second member 20 faces the surface 11 of the first member 10 and covers the concave portions 13. The second member 20 may entirely cover the concave portions 13 or may partially cover the concave portions 13. In the case where the second member 20 partially covers the concave portions 13, portions of the concave portions 13 that are not covered with the second member 20 are covered with, for example, an edge face 45 of a first shaft 41 described later. The second member 20 can cover the concave portions 13 by, for example, its surface 21. The surface 21 is for example a main surface of the second member 20 and a flat surface facing the surface 11 of the first member 10. The surface 21 of the second member 20 can be for example brought into close contact with the surface 11 of the first member 10. In the case where both the surface 11 of the first member 10 and the surface 21 of the second member 20 are flat surfaces, the surface 21 of the second member 20 can be for example brought into surface contact with the surface 11 of the first member 10. For example, when the surface 21 of the second member 20 is brought into surface contact with the surface 11 of the first member 10, the concave portions 13 are covered with the second member 20. Neither concave portion nor convex portion is formed on the surface 21 of the second member 20. However, as long as the second member 20 can cover the concave portions 13, a concave portion or a convex portion may be formed on the surface 21.

The second member 20 may have a through hole 22. The through hole 22 extends in a thickness direction of the second member 20. The through hole 22 is for example circular in plan view. The through hole 22 is positioned for example around the center of gravity of the surface 21 of the second member 20. The second member 20 is ring-shaped in plan view due to the through hole 22. The through hole 22 for example overlaps the through hole 12 of the first member 10. The diameter of the through hole 22 may be the same as or different from the diameter of the through hole 12 of the first member 10.

The supercooling release device 100 may include a plurality of the first members 10 and a plurality of the second members 20. The number of the first members 10 and the number of the second members 20 are each not particularly limited, and are each for example 1 or more and 10 or less. In the case where the supercooling release device 100 includes the first members 10 and the second members 20, the first members 10 and the second members 20 are for example alternately arranged in the direction X.

Figure 4:
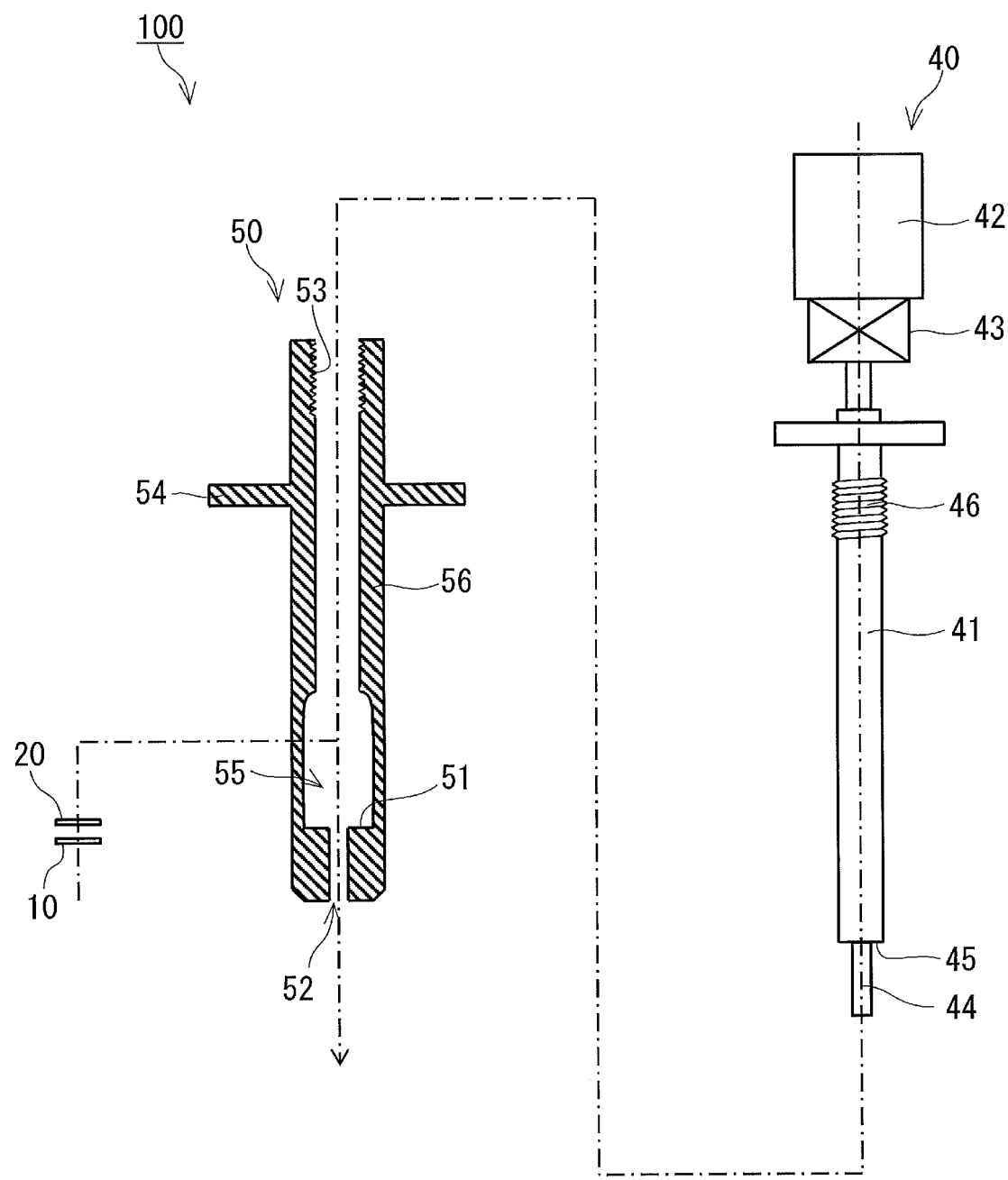
FIG. 4 is an exploded view of the supercooling release device shown in FIG. 1.

As shown in FIG. 1, the supercooling release device 100 may further include a fourth member 40 and a fifth member 50. FIG. 4 is an exploded view of the supercooling release device 100 of FIG. 1. As shown in FIG. 4, the fourth member 40 includes the first shaft 41, a motor 42, a gear 43, and a second shaft 44. The first shaft 41 functions as a piston applying a load to at least one of the first member 10 and the second member 20. Specifically, one end of the first shaft 41 is connected to the motor 42 via the gear 43. The other end of the first shaft 41 is connected to the second shaft 44. The edge face 45 of the first shaft 41 is in contact with an edge face of the second shaft 44. The edge face 45 is a surface of the first shaft 41 facing the first member 10 or the second member 20.

The motor 42 functions as an actuator displacing the first shaft 41. As described later, the motor 42 can displace the first shaft 41 in a direction to the first member 10 or the second member 20 and in a direction away from the first member 10 or the second member 20. Specifically, the motor 42 can apply a torque to the first shaft 41 to rotate the first shaft 41.

The gear 43 adjusts a torque to be applied to the first shaft 41. The torque to be applied to the first shaft 41 is not particularly limited, and may be 0.05 N·m or more and 3.0 N·m or less, or 0.2 N·m or more and 3.0 N·m or less. The second shaft 44 and the first shaft 41 each extend in the direction X. The diameter of the edge face of the second shaft 44 is smaller than the diameter of the edge face 45 of the first shaft 41. Accordingly, a portion of the edge face 45 of the first shaft 41 is exposed outside the fourth member 40.

As shown in FIGS. 1 and 2, the second shaft 44 is inserted into the through hole 12 of the first member 10 and the through hole 22 of the second member 20. Thus, the first member 10 and the second member 20 are fixed by the fourth member 40. The edge face 45 of the first shaft 41 for example covers a surface 23 of the second member 20 facing the surface 21 of the second member 20. The edge face 45 of the first shaft 41 may entirely cover the surface 23 of the second member 20 or may partially cover the surface 23 of the second member 20. In the case where the second member 20 partially covers the concave portions 13 of the first member 10, the edge face 45 of the first shaft 41 may cover portions of the concave portions 13 that not covered with the second member 20. The edge face 45 of the first shaft 41 can be brought into contact with the surface 23 of the second member 20.

As shown in FIGS. 1 and 4, a male screw portion 46 is formed on a side surface of the first shaft 41. The male screw portion 46 is screwed into a female screw portion 53 of the fifth member 50 described later. The male screw portion 46 and the female screw portion 53 allow the first shaft 41 to move forward and backward in the direction X. Specifically, when the first shaft 41 is rotated clockwise by the motor 42, the male screw portion 46 is further screwed into the female screw portion 53, and thus the first shaft 41 moves in the direction X. When the edge face 45 of the first shaft 41 is in contact with the surface 23 of the second member 20, movement of the first shaft 41 in the direction X can apply a load to the second member 20 in the direction X. Application of the load to the second member 20 brings the surface 21 of the second member 20 into close contact with the surface 11 of the first member 10. In the case where both the surface 11 of the first member 10 and the surface 21 of the second member 20 are flat surfaces, application of the load to the second member 20 brings the surface 21 of the second member 20 into surface contact with the surface 11 of the first member 10. On the other hand, when the first shaft 41 is rotated counterclockwise by the motor 42, the male screw portion 46 is loosened, and thus the first shaft 41 moves in a direction opposite to the direction X. Thus, the load applied to the second member 20 is removed.

In FIG. 1, the second member 20 is disposed between the first member 10 and the first shaft 41. However, as long as the second member 20 covers the concave portions 13 of the first member 10, the position of the second member 20 and the position of the first member 10 may be replaced with each other. That is, the first member 10 may be disposed between the second member 20 and the first shaft 41. In this case, the fourth member 40 can apply a load to the first member 10 in a direction from the first member 10 to the second member 20. In this way, the supercooling release device 100 can, by the fourth member 40, apply a load to at least one of the first member 10 and the second member 20 to bring the first member 10 and the second member 20 into close contact with each other. Between the fourth member 40 and the first member 10 or the second member 20, another member may be disposed such as a third member described later. In this case, the fourth member 40 can apply a load to at least one of the first member 10 and the second member 20 via the other member.

In the case where the edge face 45 of the first shaft 41 faces the surface 11 of the first member 10 and can cover the concave portions 13 of the first member 10, the first shaft 41 can function as the second member. In the case where the first shaft 41 functions as the second member, the supercooling release device 100 does not need to include the second member 20.

FIGS. 1 and 4 each show a cross section of the fifth member 50. The fifth member 50 functions as a cylinder housing the first member 10 and the second member 20. As shown in FIG. 4, the fifth member 50 has a body portion 56. The body portion 56 is for example cylindrical and extends in the direction X. The body portion 56 houses the first member 10, the second member 20, and the fourth member 40. Specifically, the body portion 56 houses the first shaft 41 and the second shaft 44 of the fourth member 40.

The body portion 56 has a support portion 51, a through hole 52, the female screw portion 53, and an opening portion 55. The support portion 51 is for example a plane orthogonal to the direction X inside the body portion 56. The support portion 51 supports the first member 10 and the second member 20. Specifically, the first member 10 and the second member 20 are sandwiched between the support portion 51 and the first shaft 41. The support portion 51 is for example in contact with the first member 10.

The through hole 52 extends from the support portion 51 to one end of the body portion 56 in the direction X. The through hole 52 is for example circular in plan view. The through hole 52 for example overlaps the through hole 12 of the first member 10. The diameter of the through hole 52 may be the same as or different from the diameter of the through hole 12 of the first member 10. The second shaft 44 of the fourth member 40 is inserted into the through hole 52.

The opening portion 55 is formed on a side surface of the body portion 56. The opening portion 55 extends in the direction X. The support portion 51 is exposed outside the fifth member 50 through the opening portion 55.

The first member 10 and the second member 20, which are housed in the body portion 56, are exposed outside the supercooling release device 100 through the opening portion 55. The number of the opening portion 55 is not particularly limited, and is for example 1 or more and 10 or less. As shown in FIG. 2, in the supercooling release device 100 of the present embodiment, the fifth member 50 has two opening portions 55a and 55b. The opening portion 55a and the opening portion 55b face each other. In FIG. 2, the body portion 56 of the fifth member 50 is partially omitted for description.

As shown in FIGS. 1 and 4, the female screw portion 53 is formed inside the body portion 56. The female screw portion 53 is for example in contact with the other end of the body portion 56. As described above, the male screw portion 46 of the first shaft 41 is screwed into the female screw portion 53.

The fifth member 50 may further include a fixing portion 54. By the fixing portion 54, the supercooling release device 100 can be fixed to a heat storage device. The fixing portion 54 for example has an opening into which a fastener such as a screw or a bolt can be screwed.

As shown in FIG. 1, the supercooling release device 100 may further include a coupling portion 57. The coupling portion 57 for example couples the motor 42 to the first shaft 41 in the fourth member 40. The motor 42 may drive the first shaft 41 to rotate via the coupling portion 57.

Examples of materials of the first member 10, the second member 20, the first shaft 41, the second shaft 44, and the fifth member 50 include a metal and a resin. Examples of the metal include copper and aluminum. The metal may be an alloy. Examples of the alloy include an alloy containing the above metal and stainless steel. Examples of the resin include polyphenylene sulfide and polyether ether ketone.

Next, a method for using the supercooling release device 100 will be described.

First of all, preparation of the supercooling release device 100 is performed by the following method. First, a tip portion of the supercooling release device 100 is brought into contact with a heat storage material in a supercooled state. Specifically, the supercooling release device 100 is immersed in the heat storage material such that the heat storage material in the supercooled state enters the body portion 56 of the fifth member 50 through the opening portion 55 of the fifth member 50. When the supercooling release device 100 is brought into contact with the heat storage material, this stimulation causes crystallization of the heat storage material to proceed. To facilitate crystallization of the heat storage material, crystals of the heat storage material may be adhered in advance to the portion of the supercooling release device 100 that is to be brought into contact with the heat storage material. As the crystallization of the heat storage material proceeds, crystals of the heat storage material are housed in the concave portions 13 of the first member 10.

Next, the motor 42 is operated to move the first shaft 41 in the direction X. This applies a load to the second member 20 in the direction X, and thus the surface 21 of the second member 20 is moved to and brought into close contact with the surface 11 of the first member 10. That is, the concave portions 13 of the first member 10 are covered with the second member 20. At this time, the heat storage material in a solid state is housed in a narrow space surrounded by each of the concave portions 13 and the surface 21 of the second member 20. A minute amount of the heat storage material may also be present between the surface 21 of the second member 20 and the surface 11 of the first member 10. Through the above operation, preparation of the supercooling release device 100 is completed.

Next, a method for releasing the supercooled state of the heat storage material by using the supercooling release device 100 subjected to the above operation will be described. First, the heat storage material is heated. When the temperature of the heat storage material exceeds the melting point of the heat storage material, the heat storage material melts. At this time, the concave portions 13 of the first member 10 are covered with the second member 20. This restricts contact between the portion of the heat storage material held in the concave portions 13 and a portion of the heat storage material present outside the concave portions 13. Thus, the portion of the heat storage material housed in the concave portions 13 is less likely to melt. That is, even after the heat storage material is heated, the portion of the heat storage material housed in the concave portions 13 is likely to remain in the concave portions 13 as crystals.

Next, the heat storage material is cooled. As a result, the temperature of the heat storage material falls below the melting point of the heat storage material, and thus the heat storage material is supercooled. At this time, the concave portions 13 of the first member 10 are covered with the second member 20, and this restricts contact between the portion of the heat storage material held in the concave portions 13 and the portion of the heat storage material present outside the concave portions 13. Thus, the supercooled state of the heat storage material is maintained. Next, the motor 42 is operated at a desired time to move the first shaft 41 in the direction opposite to the direction X. This removes the load applied to the second member 20, and thus the surface 21 of the second member 20 slightly moves away from the surface 11 of the first member 10. In other words, the second member 20 displaces relative to the first member 10. At this time, the heat storage material in the supercooled state enters between the surface 21 of the second member 20 and the surface 11 of the first member 10. The heat storage material in the supercooled state comes into contact with the crystals of the heat storage material remaining in the concave portions 13. That is, contact is allowed between the portion of the heat storage material held in the concave portions 13 and the portion of the heat storage material present outside the concave portions 13. This releases the supercooled state of the heat storage material thus to solidify the heat storage material.

In the supercooling release device 100 of the present embodiment, the both edge faces of the concave portions 13 of the first member 10 are exposed outside the first member 10. Further, the first member 10 and the fifth member 50 have the through holes 12 and 52, respectively. Accordingly, the heat storage material in the supercooled state can quickly enter the concave portions 13. The structure of the supercooling release device 100 of the present embodiment is suitable for releasing a supercooled state of a heat storage material. According to the supercooling release device 100 of the present embodiment, even in the case where the heat storage material is cooled after being heated to a high temperature, crystals of the heat storage material tend to remain in the concave portions 13, and thus the supercooled state of the heat storage material can be released with a high probability. In this way, the supercooling release device 100 of the present embodiment can release the supercooled state of the heat storage material with a high reliability.

Embodiment 2

Figure 5:
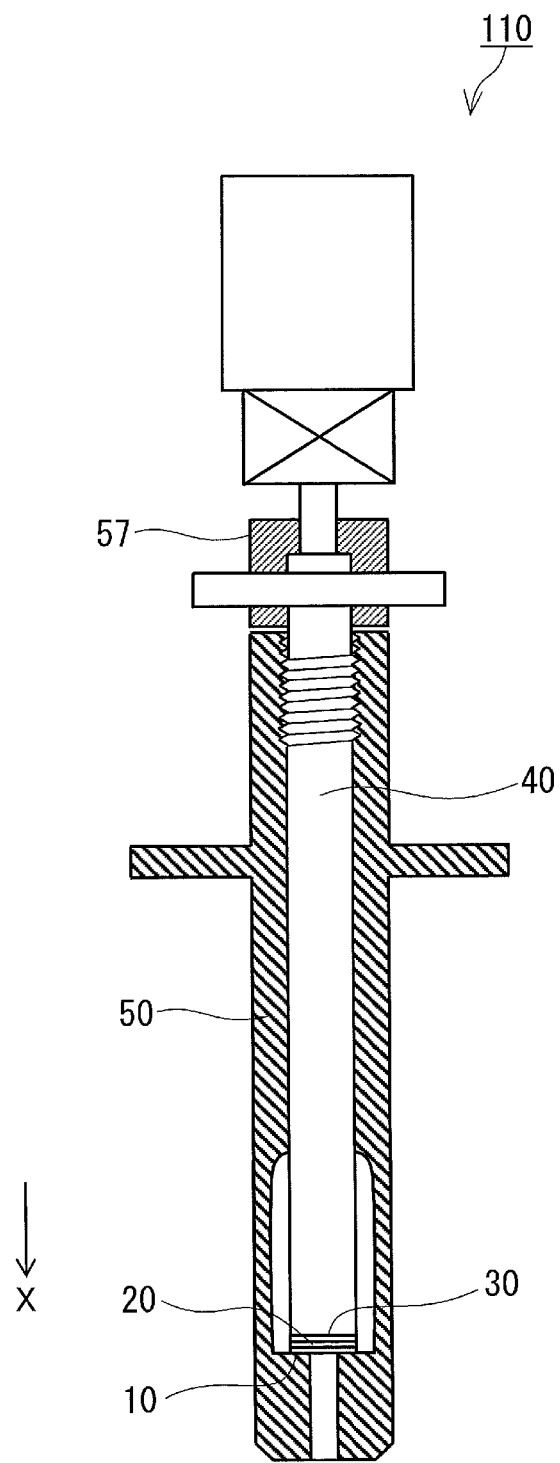
FIG. 5 is a schematic cross-sectional view of a supercooling release device according to Embodiment 2 of the present disclosure.
Figure 6:
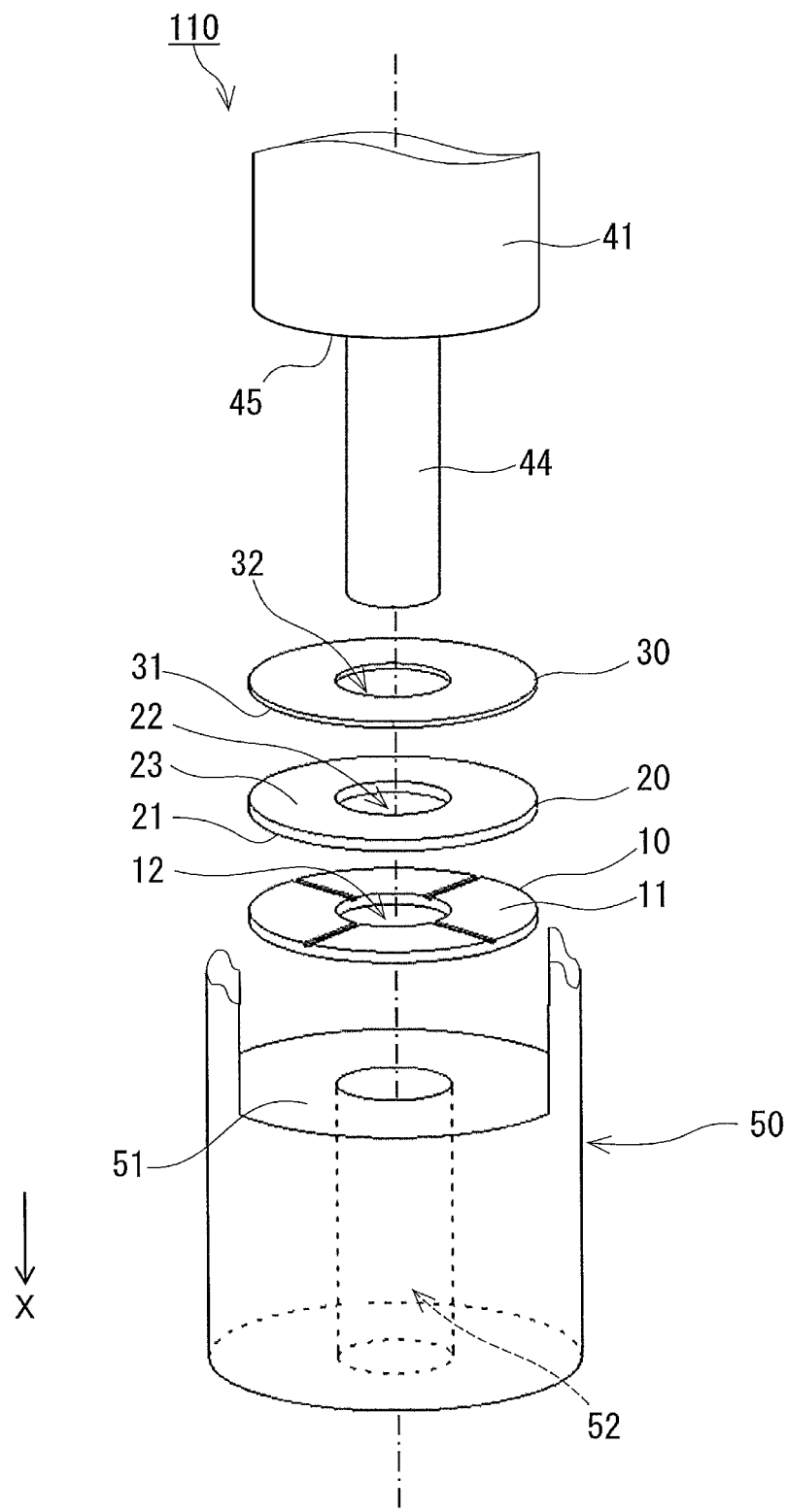
FIG. 6 is an exploded perspective view showing a portion of the supercooling release device shown in FIG. 5.

FIG. 5 is a schematic cross-sectional view of a supercooling release device 110 of the present Embodiment 2. FIG. 6 is an exploded perspective view showing a portion of the supercooling release device 110. As shown in FIGS. 5 and 6, the supercooling release device 110 further includes an elastically deformable third member 30. Except for the above, the structure of the supercooling release device 110 is the same as the structure of the supercooling release device 100 of Embodiment 1. Accordingly, the same reference numerals are given to elements common to the supercooling release device 100 of Embodiment 1 and the supercooling release device 110 of the present embodiment, and descriptions thereof may be omitted. That is, the descriptions of the following embodiments can be applied to each other unless there is technical inconsistency. Further, the embodiments may be combined with each other unless there is technical inconsistency.

As long as the third member 30 is elastically deformable, the third member 30 is not limited to have any particular shape, and is for example plate-shaped. The following describes, as an example, a case where the third member 30 is tabular. The third member 30 is for example circular in plan view. The third member 30 may be rectangular in plan view.

In the supercooling release device 110, the second member 20 is positioned between the first member 10 and the third member 30, or the first member 10 is positioned between the second member 20 and the third member 30. In FIG. 6, the first member 10, the second member 20, and the third member 30 are arranged in this order. Specifically, the third member 30 is disposed between the first shaft 41 and the second member 20. However, the third member 30 may be disposed between the first member 10 and the support portion 51. As described above, as long as the second member 20 covers the concave portions 13 of the first member 10, the position of the second member 20 and the position of the first member 10 may be replaced with each other. In this case, the third member 30 may be disposed between the first shaft 41 and the first member 10, or may be disposed between the second member 20 and the support portion 51. In the case where the supercooling release device 110 includes the plurality of first members 10 and the plurality of second members 20, the third member 30 may be disposed between one set of the first member 10 and the second member 20 and another set of the first member 10 and the second member 20.

The third member 30 may have a through hole 32. The through hole 32 extends in a thickness direction of the third member 30. The through hole 32 is for example circular in plan view. The through hole 32 is positioned for example around the center of gravity of a surface 31 that is a main surface of the third member 30. The third member 30 is ring-shaped in plan view due to the through hole 32. The through hole 32 for example overlaps at least one of the through hole 12 of the first member 10 and the through hole 22 of the second member 20. The diameter of the through hole 32 may be the same as or different from the diameter of the through hole 12 of the first member 10 or the diameter of the through hole 22 of the second member 20.

The third member 30 can elastically deform by, for example, being compressed in the thickness direction of the third member 30. The third member 30 is for example a member formed from a material having elasticity according to Hooke's law. The material of the third member 30 is for example a resin. The third member 30 may contain at least one selected from the group consisting of a silicone resin, a urethane resin, and an epoxy resin, or may contain a silicone resin. The silicone resin may be a silicone rubber. As long as the third member 30 is elastically deformable, the third member 30 may contain a metal.

The supercooling release device 110 may include a plurality of the third members 30. As an example, the supercooling release device 110 may include the two third members 30. One of the two third members 30 may be disposed between the first shaft 41 and the second member 20, and the other third member 30 may be disposed between the first member 10 and the support portion 51. The number of the third members 30 can be adjusted in accordance with the number of the first members 10 and the number of the second members 20, and is for example 1 or more and 10 or less.

The third member 30 elastically deforms by, for example, being compressed while being in contact with the first member 10 or the second member 20. For example, in the supercooling release device 110, when the first shaft 41 is moved in the direction X, the third member 30 is sandwiched between the first shaft 41 and the second member 20 to be compressed in the thickness direction thereof. Thus, the third member 30 elastically deforms.

The elastically deformed third member 30 can uniformly apply a load to the first member 10 or the second member 20. This allows the second member 20 to be easily brought into close contact with the surface 11 of the first member 10. That is, contact between a portion of a heat storage material held in the concave portions 13 and a portion the heat storage material present outside the concave portions 13 can be restricted sufficiently. According to the third member 30, when a heat storage material is heated, a portion of the heat storage material housed in the concave portions 13 tends to remain in the concave portions 13 as crystals. Accordingly, the supercooling release device 110 can release the supercooled state of the heat storage material with a higher probability.

The third member 30 can also bring the second member 20 into close contact with the surface 11 of the first member 10 by a relatively small load. Reduction in load to be applied to the first member 10 or the second member 20 tends to improve durability of the members constituting the supercooling release device 110.

Modification of Embodiment 2

Figure 7A:
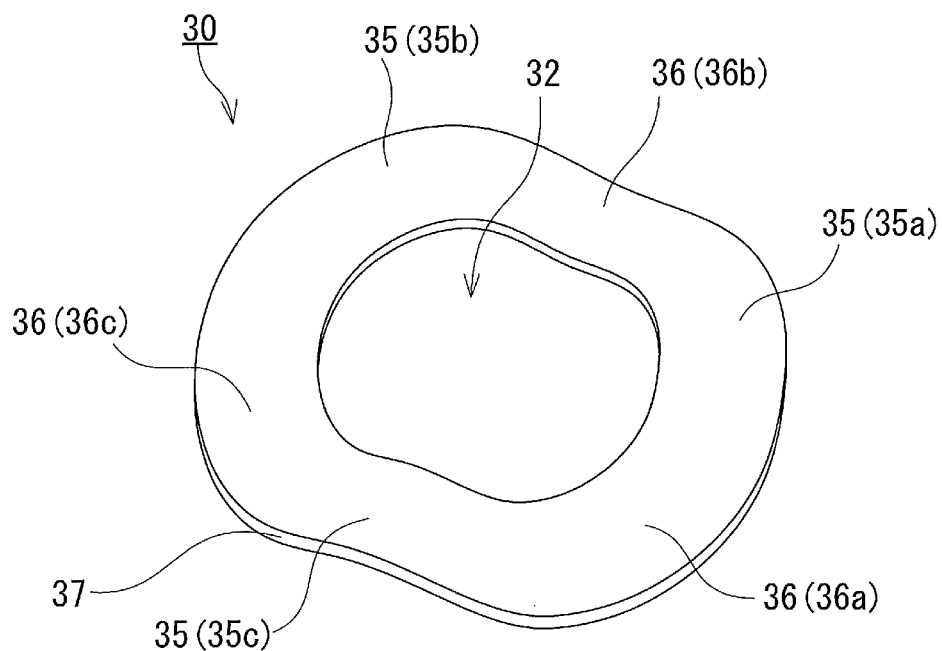
FIG. 7A is a perspective view showing a modification of a third member included in the supercooling release device shown in FIG. 5.

FIG. 7A is a perspective view showing a modification of the third member 30 included in the supercooling release device 110. As shown in FIG. 7A, the third member 30 may be corrugated. The corrugated third member 30 for example has a plurality of ridge portions 35 and a plurality of valley portions 36. The number of the ridge portions 35 and the number of the valley portions 36 are each not particularly limited, and are each for example 3 or more and 10 or less. In the present embodiment, the third member 30 has three ridge portions 35a, 35b, and 35c and three valley portions 36a, 36b, and 36c. The ridge portions 35a, 35b, and 35c and the valley portions 36a, 36b, and 36c are for example alternately arranged at equal intervals along a circumferential direction of a virtual circle defined by an outer circumferential surface 37 of the third member 30. The ridge portions 35a, 35b, and 35c may have the same height or different heights. The valley portions 36a, 36b, and 36c may have the same height or different heights.

Examples of a material of the corrugated third member 30 include a metal and a resin. From the viewpoint of improving the durability of the third member 30, the corrugated third member 30 may be made of a metal. The metal contained in the corrugated third member 30 is for example copper, aluminum, iron, nickel, or titanium. The metal contained in the corrugated third member 30 may be an alloy. The alloy contained in the corrugated third member 30 is for example an alloy including the above metal or stainless steel. The corrugated third member 30 may contain at least one selected from the group consisting of a silicone resin, a urethane resin, and an epoxy resin, or may contain a silicone resin.

When the corrugated third member 30 is compressed in the thickness direction thereof, the third member 30 elastically deforms such that the heights of the ridge portions 35 and the valley portions 36 are reduced. The elastically deformed third member 30 can uniformly apply a load to the first member 10 or the second member 20 by the ridge portions 35 or the valley portions 36. The corrugated third member 30 has a tendency that the larger number of the ridge portions 35 and the larger number of the valley portions 36 allow a more uniform load application to the first member 10 or the second member 20. By uniformly applying a load to the first member 10 or the second member 20, the second member 20 can be easily brought into close contact with the surface 11 of the first member 10.

Another Modification of Embodiment 2

Figure 7B:
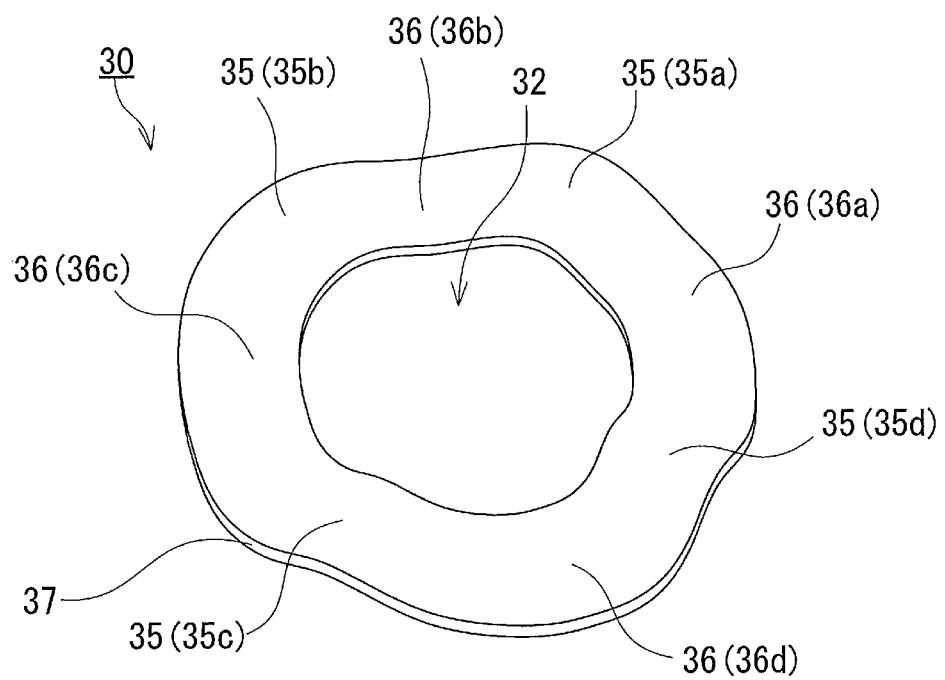
FIG. 7B is a perspective view showing another modification of the third member.

FIG. 7B is a perspective view showing another modification of the third member 30. As shown in FIG. 7B, the third member 30 has four ridge portions 35a, 35b, 35c, and 35d and four valley portions 36a, 36b, 36c, and 36d. The ridge portions 35a, 35b, 35c, and 35d and the valley portions 36a, 36b, 36c, and 36d are for example alternately arranged at equal intervals along the circumferential direction of the virtual circle defined by the outer circumferential surface 37 of the third member 30. The ridge portions 35a, 35b, 35c, and 35d may have the same height or different heights. The valley portions 36a, 36b, 36c, and 36d may have the same height or different heights.

Still Another Modification of Embodiment 2

Figure 7C:
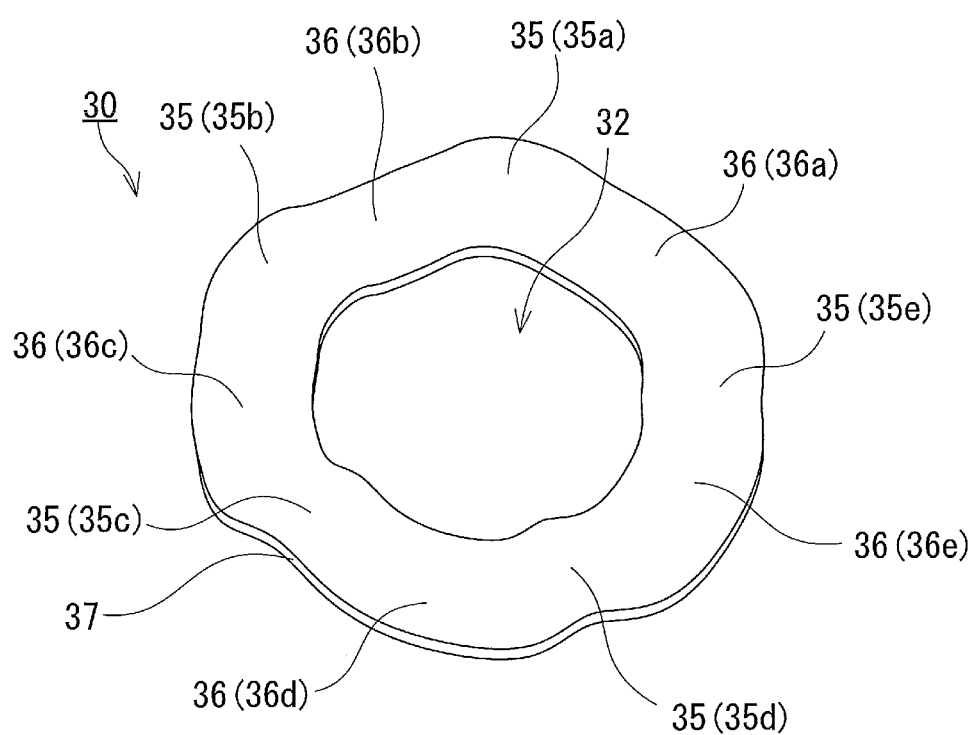
FIG. 7C is a perspective view showing still another modification of the third member.

FIG. 7C is a perspective view showing still another modification of the third member 30. As shown in FIG. 7C, the third member 30 has five ridge portions 35a, 35b, 35c, 35d, and 35e and five valley portions 36a, 36b, 36c, 36d, and 36e. The ridge portions 35a, 35b, 35c, 35d, and 35e and the valley portions 36a, 36b, 36c, 36d, and 36e are for example alternately arranged at equal intervals along the circumferential direction of the virtual circle defined by the outer circumferential surface 37 of the third member 30. The ridge portions 35a, 35b, 35c, 35d, and 35e may have the same height or different heights. The valley portions 36a, 36b, 36c, 36d, and 36e may have the same height or different heights.

As long as the third member 30 is elastically deformable, the third member 30 is not limited to have the tabular shape and the corrugated shape shown in FIGS. 6 and 7A to 7C. The third member 30 may have for example a shape of a spring washer as specified in JIS B1251:2018, and may have a shape of a conical spring washer.

Embodiment 3

Figure 8:
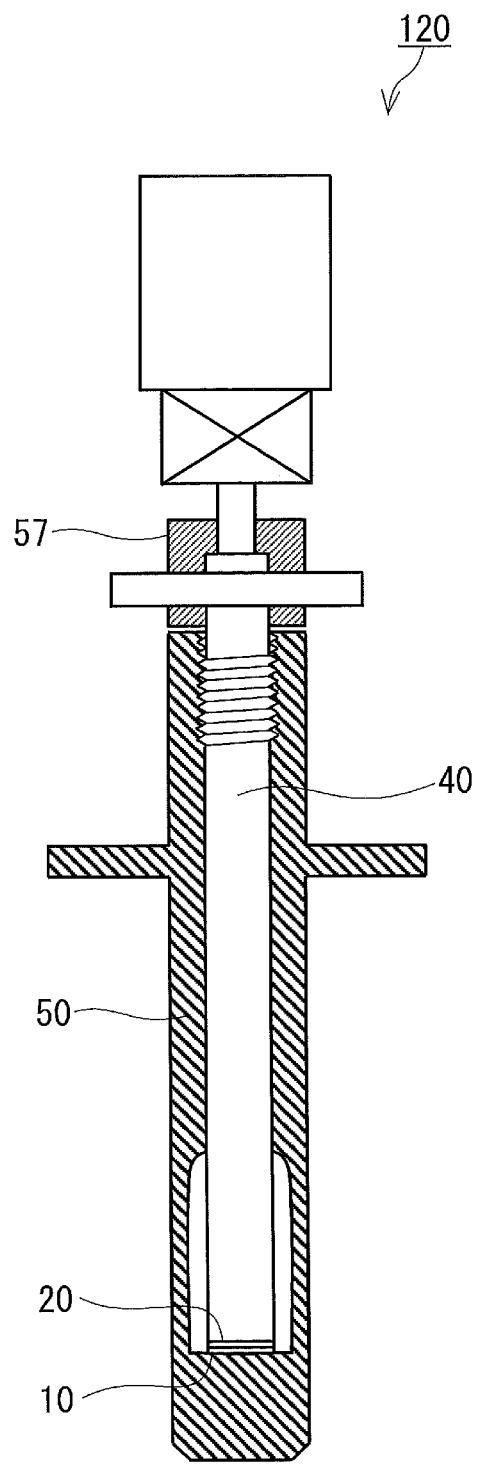
FIG. 8 is a schematic cross-sectional view of a supercooling release device according to Embodiment 3 of the present disclosure.
Figure 9:
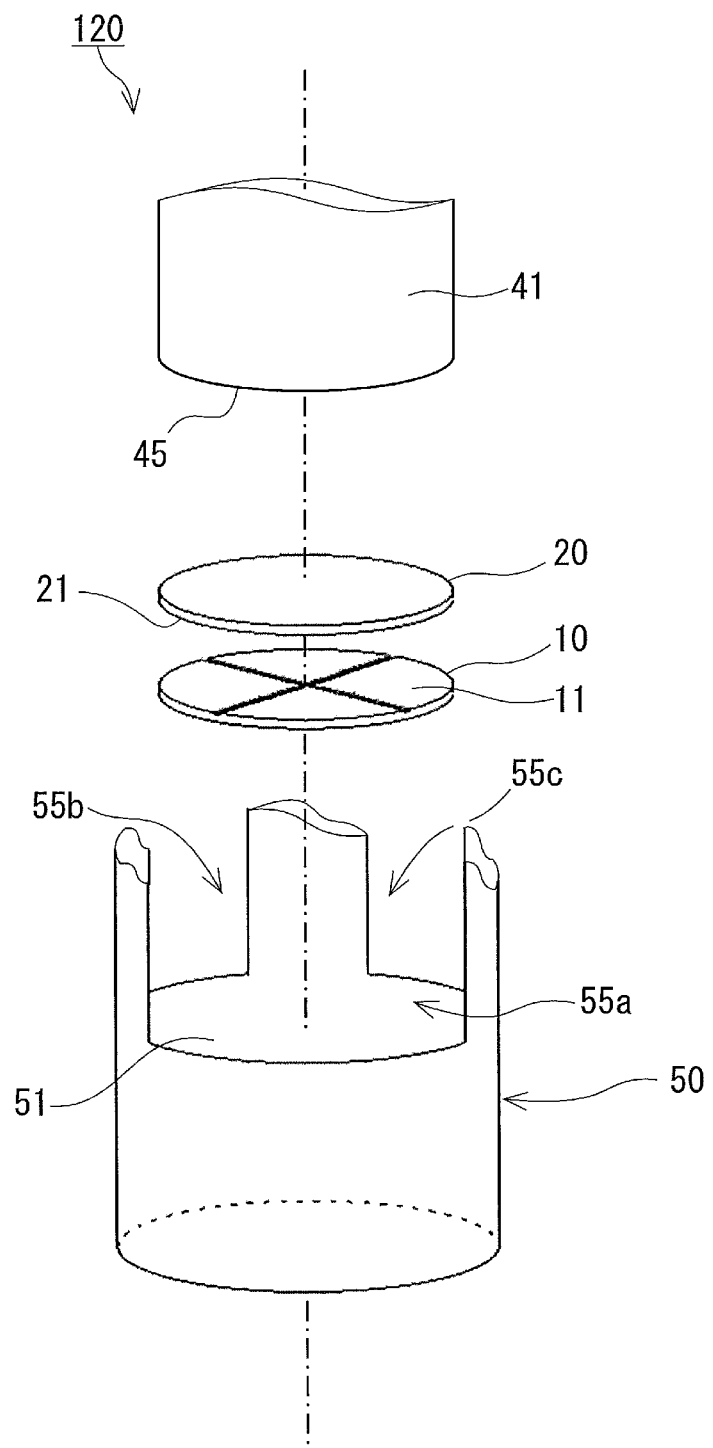
FIG. 9 is an exploded perspective view showing a portion of the supercooling release device shown in FIG. 8.
Figure 10:
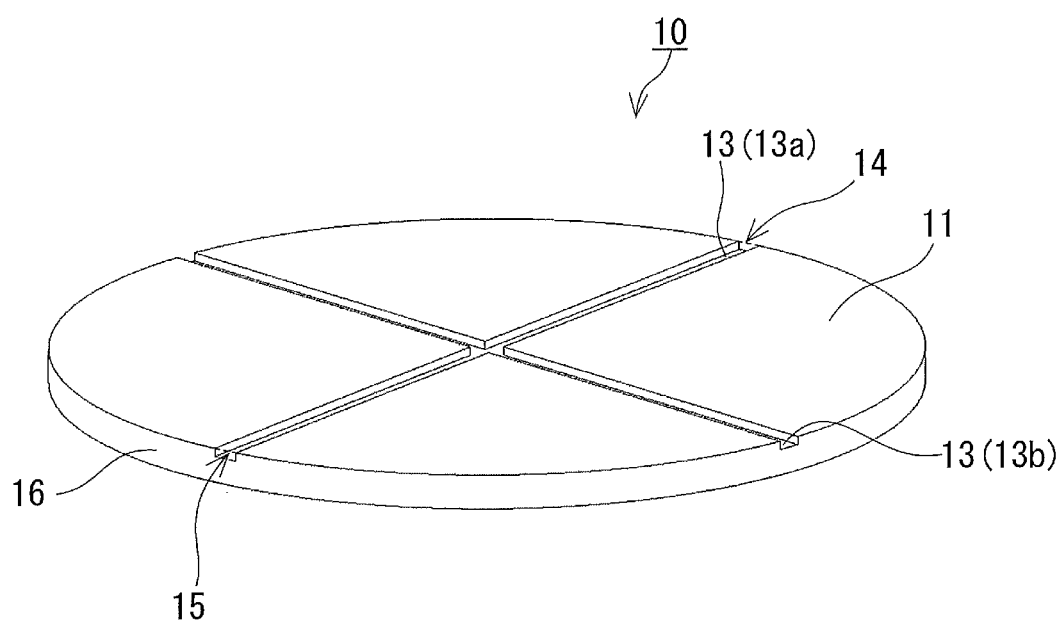
FIG. 10 is a perspective view of a first member included in the supercooling release device shown in FIG. 8.

FIG. 8 is a schematic cross-sectional view of a supercooling release device 120 of the present Embodiment 3. FIG. 9 is an exploded perspective view showing a portion of the supercooling release device 120. FIG. 10 is a perspective view of the first member 10 included in the supercooling release device 120. As shown in FIGS. 8 to 10, the first member 10 and the second member 20 of the supercooling release device 120 each do not have a through hole. The fourth member 40 does not have a second shaft. The body portion 56 of the fifth member 50 does not have a through hole. The body portion 56 of the fifth member 50 has three opening portions 55a, 55b, and 55c. Except for the above, the structure of the supercooling release device 120 is the same as the structure of the supercooling release device 100 of Embodiment 1.

As shown in FIG. 10, the one edge face 14 and the other edge face 15 of each of the concave portions 13 of the first member 10 are each exposed outside the first member 10 through the outer circumferential surface 16 of the first member 10. The one edge face 14 and the other edge face 15 of the concave portion 13 are positioned at a different one of the end portions of the surface 11. The concave portion 13 extends via the center of the virtual circle defined by the outer circumferential surface 16 of the first member 10. The concave portion 13 may extend straight via the above center of the virtual circle.

In the present embodiment, the first member 10 has the two concave portions 13a and 13b. The concave portion 13a intersects the concave portion 13b. The two concave portions 13a and 13b each extend radially from the center of the virtual circle defined by the outer circumferential surface 16.

As described above, the body portion 56 of the fifth member 50 has the three opening portions 55a, 55b, and 55c. With this structure of the body portion 56, it is possible to inhibit the first member 10 and the second member 20 from moving from the support portion 51 and thus falling off from the body portion 56.

Embodiment of Heat Storage Device

Figure 11:
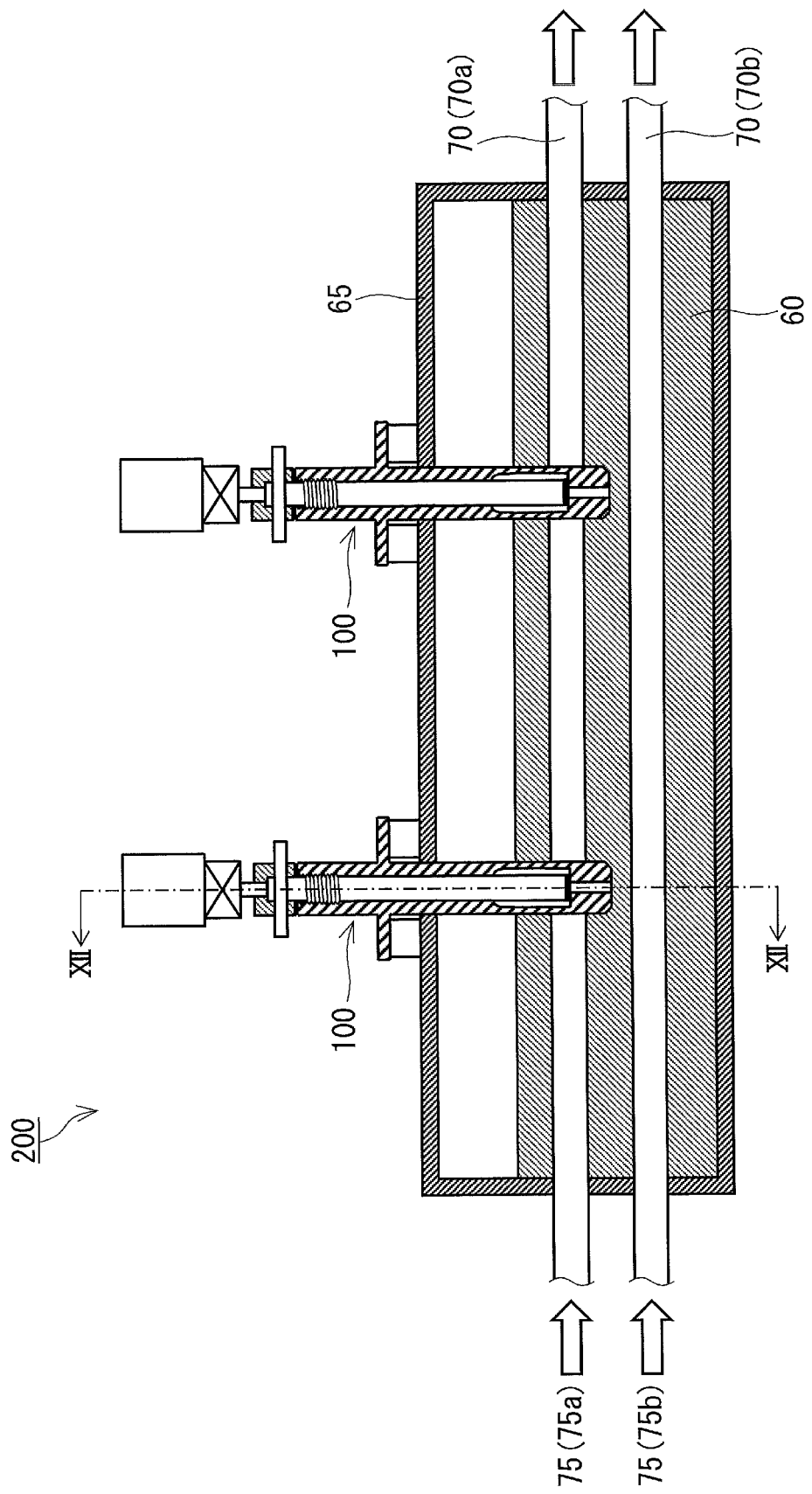
FIG. 11 is a schematic cross-sectional view of a heat storage device using the supercooling release device of the present disclosure.
Figure 12:
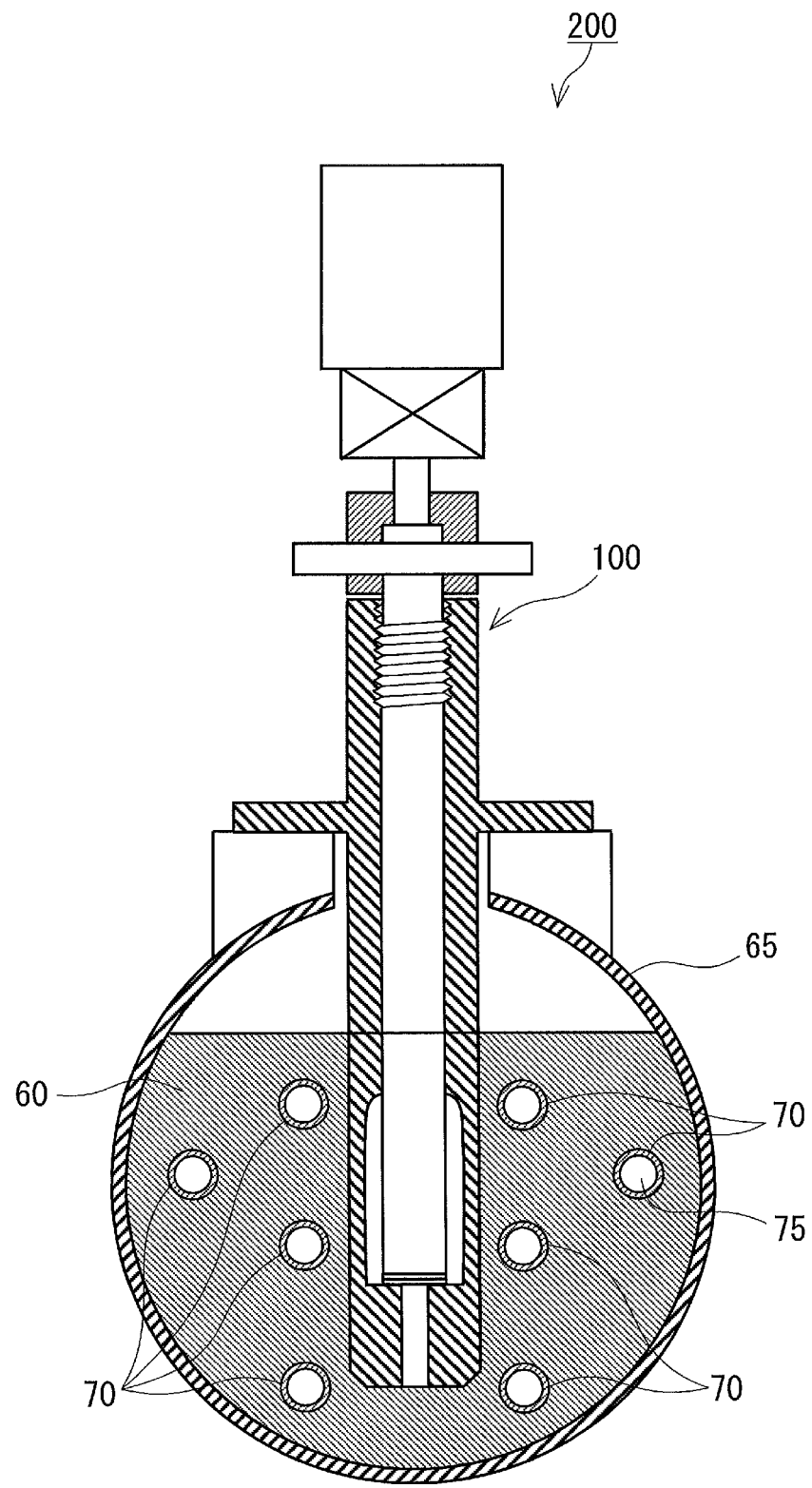
FIG. 12 is a schematic cross-sectional view taken along a line XII-XII of the heat storage device shown in FIG. 11.

FIG. 11 is a schematic cross-sectional view of a heat storage device 200 of the present embodiment. FIG. 12 is a schematic cross-sectional view taken along a line XII-XII of the heat storage device 200 shown in FIG. 11. As shown in FIG. 11, the heat storage device 200 includes the supercooling release device 100, a heat storage material 60, and a container 65. The supercooling release device 100 is disposed so as to be in contact with the heat storage material 60. Specifically, the supercooling release device 100 is inserted into the container 65 from above the container 65. The tip portion of the supercooling release device 100 is in contact with the heat storage material 60. The supercooling release device 100 is fixed, outside the container 65, to the container 65 by the fixing portion 54 of the fifth member 50. For example, an opening is provided in each of the fixing portion 54 and the container 65, and fasteners are screwed into these openings thus to fix the supercooling release device 100 to the container 65. The number of the supercooling release devices 100 included in the heat storage device 200 is not particularly limited, and is for example 1 or more and 5 or less. In the present embodiment, the heat storage device 200 includes the two supercooling release devices 100.

The heat storage material 60 can be a latent heat storage material that stores heat by utilizing phase change of a material. The heat storage material 60 can store heat and release heat for example by phase transition between a liquid phase and a solid phase. The heat storage material 60 for example includes at least one selected from the group consisting of a salt hydrate, a sugar alcohol, and a clathrate hydrate. The heat storage material 60 may include, as a main component, a salt hydrate, a sugar alcohol, or a clathrate hydrate. The term "main component" means a component having the largest amount by weight in the heat storage material 60.

Examples of the salt hydrate include sodium acetate trihydrate, sodium sulfate decahydrate, sodium hydrogen sulfate monohydrate, lithium chlorate trihydrate, lithium perchlorate trihydrate, potassium fluoride dihydrate, potassium fluoride tetrahydrate, calcium chloride dihydrate, calcium chloride tetrahydrate, calcium chloride hexahydrate, lithium nitrate trihydrate, sodium sulfate decahydrate, sodium carbonate heptahydrate, sodium carbonate decahydrate, calcium bromide dihydrate, disodium hydrogen phosphate dihydrate, disodium hydrogen phosphate heptahydrate, disodium hydrogen phosphate dodecahydrate, iron chloride tetrahydrate, iron chloride hexahydrate, sodium thiosulfate pentahydrate, magnesium sulfate heptahydrate, lithium acetate dihydrate, sodium hydroxide monohydrate, barium hydroxide monohydrate, barium hydroxide octahydrate, ammonium aluminum sulfate hexahydrate, sodium pyrophosphate decahydrate, trisodium phosphate hexahydrate, trisodium phosphate octahydrate, and trisodium phosphate dodecahydrate.

Examples of the sugar alcohol include glycerin, xylitol, sorbitol, and erythritol. Examples of the clathrate hydrate include tetrahydrofuran clathrate hydrate, trimethylamine semiclathrate hydrate, sulfur dioxide clathrate hydrate, tetrabutylammonium formate hydrate, tetrabutylammonium acetate hydrate, tetrabutylammonium bromide (TBAB) hydrate, tetrabutylammonium chloride (TBACl) hydrate, and tetrabutylammonium fluoride (TBAF) hydrate.

The heat storage material 60 may further contain an additive such as a stabilizer, water, and the like, in addition to the salt hydrate, the sugar alcohol, or the clathrate hydrate.

The container 65 houses the heat storage material 60. As shown in FIGS. 11 and 12, the container 65 is for example columnar. The container 65 may be elliptic columnar or rectangular columnar. A ratio of the volume of the heat storage material 60 to the volume of the container 65 is not particularly limited, and is for example 70 vol % or more and 80 vol % or less. A material of the container 65 is not particularly limited, and is for example a metal or a resin. Examples of the metal include copper and aluminum. The metal may be an alloy. Examples of the alloy include an alloy including the above metal and stainless steel. Examples of the resin include polyphenylene sulfide and polyether ether ketone.

As shown in FIGS. 11 and 12, the heat storage device 200 further includes a pipe 70. The pipe 70 is in contact with the heat storage material 60 inside the container 65. The pipe 70 for example extends in a direction from one of a pair of edge faces of the container 65 to the other edge face to penetrate the container 65. The pipe 70 is a flow path for the heat medium 75. The pipe 70 functions as a partition separating the heat storage material 60 and the heat medium 75 from each other. The pipe 70 is formed from a material having heat transfer properties.

The heat medium 75 imparts heat to the heat storage material 60 or recovers heat from the heat storage material 60. Examples of the heat medium 75 include water, an antifreeze solution, and an oil. The antifreeze solution is for example an ethylene glycol aqueous solution. The oil may be a lubricating oil. According to the heat medium 75, heat recovered from the heat storage material 60 can be used outside the container 65.

The heat storage device 200 may include a plurality of the pipes 70. The number of the pipes 70 is not particularly limited, and is for example 1 or more and 100 or less. As shown in FIG. 12, in the present embodiment, the heat storage device 200 includes the eight pipes 70.

In the case where the heat storage device 200 includes the pipes 70, the heat medium 75 flowing through each of the pipes 70 may be the same or different from each other. For example, in FIG. 11, a heat medium 75a flowing through a pipe 70a may be an antifreeze solution and a heat medium 75b flowing through a pipe 70b may be oil.

Embodiment of Power Device

Figure 13:
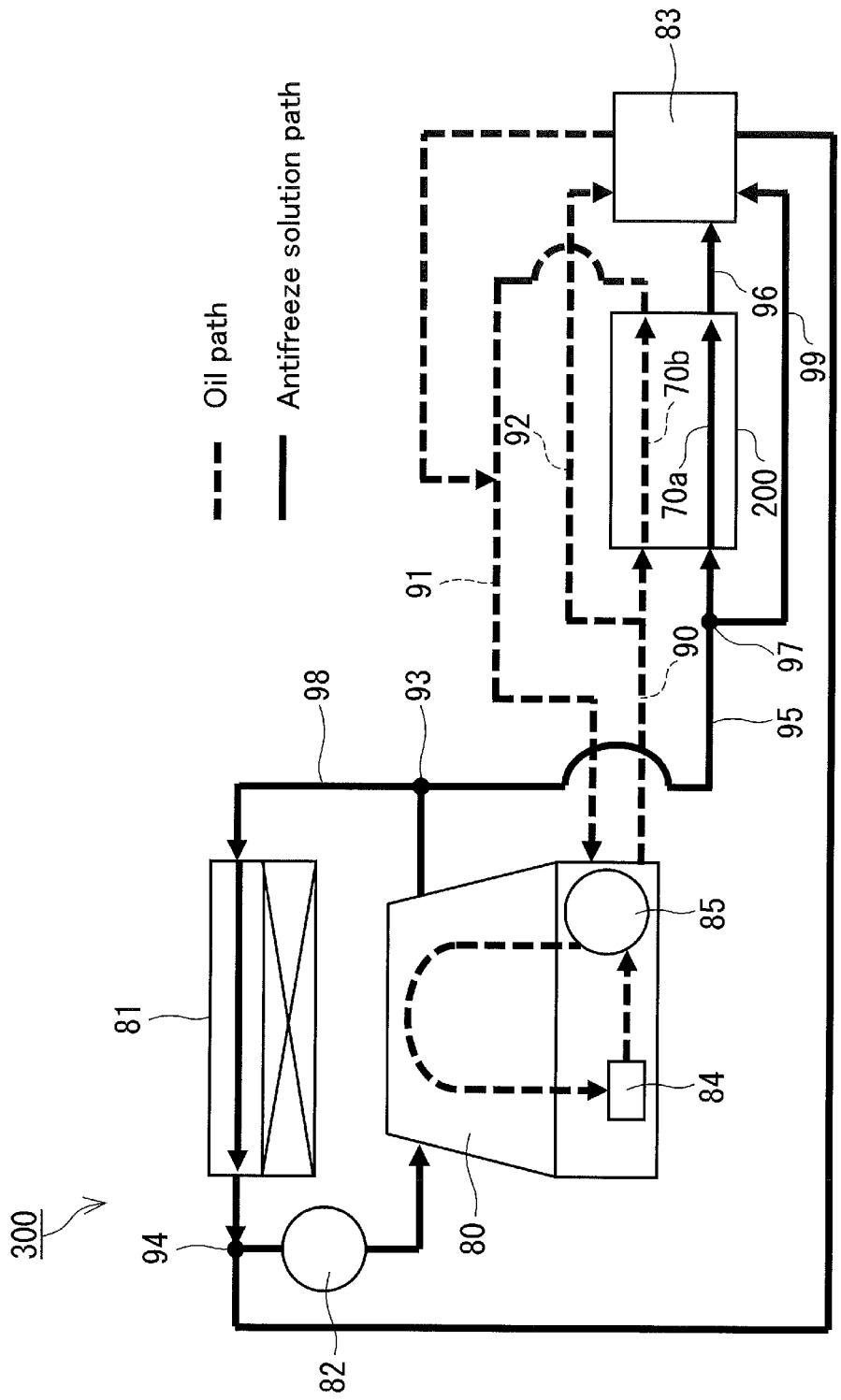
FIG. 13 is a schematic configuration diagram of a power device using the heat storage device of the present disclosure.

FIG. 13 is a schematic configuration diagram of a power device 300 of the present embodiment. As shown in FIG. 13, the power device 300 includes the heat storage device 200 and a powertrain 80. The heat storage device 200 includes the pipes 70a and 70b. An antifreeze solution flows through the pipe 70a. An oil flows through the pipe 70b. The powertrain 80 is for example an internal combustion engine. Examples of the internal combustion engine include a gasoline engine, a diesel engine, a steam engine, and an electric motor. Inside the powertrain 80, an oil and an antifreeze solution circulate. The power device 300 is for example a vehicle such as an automobile or a two-wheeled vehicle. Examples of the automobile include a gasoline automobile, a diesel automobile, and an electric automobile.

The powertrain 80 has an oil pan 84 and a pump 85. The oil pan 84 houses the oil. The pump 85 increases the pressure of the oil circulating through the powertrain 80 to adjust the flow rate of the oil.

The power device 300 further includes an oil discharge path 90. The oil discharge path 90 is a path for sending the oil discharged from the powertrain 80 to the heat storage device 200. The oil discharge path 90 has one end connected to an oil outlet of the powertrain 80 and the other end connected to an inlet of the pipe 70b of the heat storage device 200.

The power device 300 further includes an oil supply path 91. The oil supply path 91 is a path for supplying the oil to the powertrain 80. The oil supply path 91 has one end connected to an outlet of the pipe 70b of the heat storage device 200 and the other end connected to an oil inlet of the powertrain 80.

The power device 300 further includes a bypass path 92. The bypass path 92 branches from the oil discharge path 90. The bypass path 92 is connected to the oil supply path 91. On the bypass path 92, a heat exchanger 83 is disposed. The heat exchanger 83 is a liquid-liquid heat exchanger generating heat exchange between the oil flowing through the bypass path 92 and the antifreeze solution flowing through an antifreeze solution supply path 96 described later. A specific example of the heat exchanger 83 is a plate type heat exchanger.

The power device 300 further includes an antifreeze solution discharge path 95. The antifreeze solution discharge path 95 is a path for sending the antifreeze solution discharged from the powertrain 80 to the heat storage device 200. The antifreeze solution discharge path 95 has one end connected to an antifreeze solution outlet of the powertrain 80 and the other end connected to an inlet of the pipe 70a of the heat storage device 200.

The power device 300 further includes the antifreeze solution supply path 96. The antifreeze solution supply path 96 is a path for supplying the antifreeze solution to the powertrain 80. The antifreeze solution supply path 96 has one end connected to an outlet of the pipe 70a of the heat storage device 200 and the other end connected to an antifreeze solution inlet of the powertrain 80. On the antifreeze solution supply path 96, the heat exchanger 83 and a pump 82 are disposed. The pump 82 increases the pressure of the antifreeze solution flowing through the antifreeze solution supply path 96 to adjust the flow rate of the antifreeze solution.

The power device 300 further includes bypass paths 98 and 99. The bypass path 98 extends from a branch point 93 to a branch point 94. The branch point 93 is positioned on the antifreeze solution discharge path 95. The branch point 94 is positioned between the heat exchanger 83 and the pump 82 on the antifreeze solution supply path 96. On the bypass path 98, a radiator 81 is disposed. The radiator 81 cools the antifreeze solution flowing through the bypass path 98.

The bypass path 99 extends from a branch point 97 to the heat exchanger 83. The branch point 97 is positioned between the branch point 93 and the heat storage device 200 on the antifreeze solution discharge path 95. The bypass path 99 joins the antifreeze solution supply path 96 in the heat exchanger 83.

While the powertrain 80 is operated, the temperature of the powertrain 80 increases. Accordingly, the temperatures of the antifreeze solution and the oil circulating through the powertrain 80 increase, too. The antifreeze solution circulating through the powertrain 80 is partially discharged from the powertrain 80 through the antifreeze solution discharge path 95. The antifreeze solution flowing through the antifreeze solution discharge path 95 is sent to the heat storage device 200. The antifreeze solution flowing through the pipe 70a of the heat storage device 200 applies heat to the heat storage material 60 of the heat storage device 200. Thus, the heat storage material 60 can be heated. The antifreeze solution discharged from the heat storage device 200 is supplied to the powertrain 80 through the antifreeze solution supply path 96.

The antifreeze solution discharged from the powertrain 80 may be sent to the bypass path 98 or 99. The antifreeze solution sent to the bypass path 98 is cooled by the radiator 81. The cooled antifreeze solution is supplied to the powertrain 80 through the antifreeze solution supply path 96.

The oil circulating through the powertrain 80 is partially discharged from the powertrain 80 through the oil discharge path 90. The oil flowing through the oil discharge path 90 is sent to the heat exchanger 83 through the bypass path 92. In the heat exchanger 83, the temperature of the oil is higher than the temperature of the antifreeze solution. Thus, the oil is cooled by heat exchange between the oil and the antifreeze solution in the heat exchanger 83. The oil cooled in the heat exchanger 83 is supplied to the powertrain 80 through the oil supply path 91.

When the operation of the powertrain 80 is stopped, the temperatures of the oil and the antifreeze solution decrease together with the temperature of the powertrain 80. Further, the temperature of the heat storage material 60 also decreases. The temperature of the heat storage material 60 falls below the melting point of the heat storage material 60, and thus the heat storage material 60 is supercooled.

When the operation of the powertrain 80 is restarted, the supercooled state of the heat storage material 60 is released by an operation of the supercooling release device 100 of the heat storage device 200. Thus, the heat storage material 60 releases heat. The antifreeze solution flowing through the pipe 70a and the oil flowing through the pipe 70b recover the heat released from the heat storage material 60. The heated antifreeze solution is supplied to the powertrain 80 through the antifreeze solution supply path 96. The heated oil is supplied to the powertrain 80 through the oil supply path 91. Thus, the powertrain 80 can receive the heat released from the heat storage device 200. According to the power device 300, the powertrain 80 can be efficiently heated. This allows time reduction in a warm-up operation of the powertrain 80. Fuel consumption or electric power consumption during the warm-up operation can be reduced. In particular, according to the power device 300 of the present embodiment, fuel consumption or electric power consumption during the warm-up operation can be greatly reduced in a cold district where the temperature of the external environment is lower than 20° C.

EXAMPLES

The present disclosure will be specifically described based on Examples. However, the present disclosure is not limited in any way by the following Examples.

Example 1

In Example 1, a supercooling release device including first to fifth members was prepared. In the supercooling release device of Example 1, the first member was ring-shaped in plan view. The first member had an outer diameter of 7 mm. The first member had a plurality of concave portions on its surface. The number and the shape of the concave portions were the same as those of the first member shown in FIG. 3. The second member was ring-shaped in plan view. The second member had an outer diameter of 7 mm. The third member was corrugated. The third member had the same shape as the third member shown in FIG. 7A. The third member had an outer diameter of 7 mm. The third member was made of stainless steel. The fourth member and the fifth member had the same shapes as the fourth member and the fifth member shown in FIG. 1, respectively. The arrangement of the first to fifth members was the same as the arrangement shown in FIG. 5.

Example 2

A supercooling release device of Example 2 having the same configuration as that of Example 1 was prepared, except that a third member that is tabular and made of silicone rubber was used. In the supercooling release device of Example 2, the third member had the same shape as the third member shown in FIG. 6.

Example 3

A supercooling release device of Example 3 having the same configuration as that of Example 1 was prepared, except that no third member was included.

[Preparation of Supercooling Release Test]

Preparation of a supercooling release test was performed by the following method with respect to each of the supercooling release devices of Examples 1 to 3. First, 52.3 g of a heat storage material was added into a 60 mL vial. The heat storage material contained sodium acetate trihydrate as a main component. Next, the vial was heated in a thermostatic chamber set at 75° C. to completely melt the heat storage material. Next, the heat storage material was cooled using the thermostatic chamber set at 20° C. Thus, the heat storage material in a supercooled state was obtained.

Next, seed crystals of sodium acetate trihydrate were adhered in advance to a portion of the supercooling release device that is to be brought into contact with the heat storage material. Next, a tip portion of the supercooling release device was inserted into an opening portion of the vial. After the supercooling release device was inserted into the vial, the vial was sealed. By bringing the tip portion of the supercooling release device into contact with the heat storage material in the supercooled state, crystallization of the heat storage material was caused to proceed. As a result, crystals of the heat storage material were housed in the concave portions of the first member. Next, the first shaft of the fourth member was rotated clockwise thus to move the first shaft in the direction from the second member to the first member. This applied a load to the second member in the direction from the second member to the first member. The second member was brought into close contact with the first member, and thus the concave portions of the first member were covered with the second member. Through the above operation, the preparation for the supercooling release test was completed.

[Supercooling Release Test]

Next, the supercooling release test was performed by the following method on each of the supercooling release devices of Examples 1 to 3. First, the vial was heated for one hour in the thermostatic chamber set at 90° C. Next, the heat storage material was cooled using the thermostatic chamber set at 20° C. Thus, the heat storage material in a supercooled state was obtained. Next, the first shaft of the fourth member of the supercooling release device was rotated counterclockwise thus to move the first shaft in the direction from the first member to the second member. This removed the load applied to the second member to cause the second member to displace relative to the first member. At this time, whether crystallization of the heat storage material proceeded was checked.

In the case where the supercooled state of the heat storage material was released and thus crystallization of the heat storage material proceeded, the first shaft of the fourth member was moved again in the direction from the second member to the first member. Thus, the second member was brought into close contact with the first member. Next, the supercooling release test was repeated by the method described above.

In the case where the supercooled state of the heat storage material was not released and thus crystallization of the heat storage material did not proceed, the supercooling release device was removed from the vial. Next, the heat storage material adhering to the supercooling release device was crystallized using crystals of sodium acetate trihydrate. The supercooling release device was reinserted into the vial, and the vial was sealed. By bringing the tip portion of the supercooling release device into contact with the heat storage material in the supercooled state, crystallization of the heat storage material was caused to proceed. Next, the first shaft of the fourth member was moved in the direction from the second member to the first member thus to bring the second member into close contact with the first member. Next, the supercooling release test was repeated by the method described above.

Through the above operation, the supercooling release test was repeated 10 times or more. Based on obtained results, a supercooling release rate was calculated. The supercooling release rate means a ratio of the number of times the supercooled state of the heat storage material was released to the number of the tests.

TABLE 1

|  | Example 1 | Example 2 | Example 3 |
|---|---|---|---|
| Third member | Corrugated (Stainless steel) | Tabular (Silicone rubber) | Not included |
| Supercooling release rate (%) | 100 | 100 | 66.7 |

As can be seen from Table 1, the supercooling release devices of Examples 1 to 3 including the first member and the second member exhibited a high supercooling release rate. In particular, the use of the supercooling release devices of Examples 1 and 2 including the third member allowed further reliable release of the supercooled state of the heat storage material.

INDUSTRIAL APPLICABILITY

The supercooling release device of the present disclosure can, at a desired time, release a supercooled state of a heat storage material to cause the heat storage material to release heat. The heat storage device of the present disclosure is suitable for warming up apparatuses by using waste heat of an internal combustion engine, waste heat of a combustion boiler, and the like as a heat source. According to the power device of the present disclosure, energy resources can be effectively utilized. The techniques disclosed herein are also applicable to gasoline automobiles, air conditioners, water heaters, cooling systems for electric vehicles (EVs), and residential floor heating systems.

The invention claimed is:

1. A supercooling release device that releases a supercooled state of a heat storage material, the supercooling release device comprising:
a first member having a concave portion on a surface thereof; and
a second member facing the surface and covering the concave portion, wherein
the surface of the first member is a flat surface,
the second member has a flat surface facing the surface of the first member,
when the flat surface of the first member is brought into surface contact with the flat surface of the second member, the concave portion of the first member is covered with the second member, and
while a load is applied to at least one of the first member and the second member to bring the second member into close contact with the surface of the first member, the supercooled state is maintained.

2. The supercooling release device according to claim 1, wherein
the concave portion has a groove shape, and
one edge face of the concave portion is exposed outside the first member.

3. The supercooling release device according to claim 2, wherein
another edge face of the concave portion is exposed outside the first member.

4. The supercooling release device according to claim 2, wherein
the first member has a through hole extending in a thickness direction thereof, and
another edge face of the concave portion is exposed outside the first member through the through hole.

5. The supercooling release device according to claim 1, wherein
when the supercooled state is to be maintained, the second member covers the concave portion of the first member to restrict contact between a portion of the heat storage material held in the concave portion and a portion of the heat storage material present outside the concave portion, and
when the supercooled state is to be released, the second member displaces relative to the first member to allow contact between the portion of the heat storage material held in the concave portion and the portion of the heat storage material present outside the concave portion.

6. The supercooling release device according to claim 1, further comprising:
an elastically deformable third member, wherein
the second member is positioned between the first member and the third member, or the first member is positioned between the second member and the third member.

7. The supercooling release device according to claim 1, further comprising:
a piston having a surface facing the first member or the second member and configured to apply a load to at least one of the first member and the second member.

8. The supercooling release device according to claim 7, further comprising:
an actuator connected to the piston and configured to displace the piston in a direction to the first member or the second member and in a direction away from the first member or the second member.

9. The supercooling release device according to claim 8, further comprising:
a cylinder configured to house the piston and having a screw portion, wherein
the piston has a screw portion that is screwed into the screw portion of the cylinder when the piston is housed in the cylinder, and
the actuator is a motor configured to rotate the piston to displace the piston in the direction to the first member or the second member and in the direction away from the first member or the second member.

10. The supercooling release device according to claim 1, further comprising:
a cylinder housing the first member and the second member.

11. A heat storage device comprising:
the supercooling release device according to claim 1;
a heat storage material including at least one selected from the group consisting of a salt hydrate, a sugar alcohol, and a clathrate hydrate; and
a container housing the heat storage material.

12. A power device comprising:
the heat storage device according to claim 11; and
a powertrain configured to receive heat released from the heat storage device.

13. The supercooling release device according to claim 1, wherein
when the supercooled state is to be released, the load is reduced.

14. The supercooling release device according to claim 1, wherein
when the supercooled state is to be released, the second member is displaced relative to the first member.

15. The supercooling release device according to claim 14, wherein
when the supercooled state is to be released, the second member is displaced relative to the first member such that contact is allowed between a portion of the heat storage material held in the concave portion and a portion of the heat storage material present outside the concave portion.

16. The supercooling release device according to claim 1, wherein
when the supercooled state is to be released, the second member is moved away from the surface.

17. A supercooling release device that releases a supercooled state of a heat storage material, the supercooling release device comprising:
a first member having a concave portion on a surface thereof;
a second member facing the surface and covering the concave portion; and
an elastically deformable third member, wherein
the second member is positioned between the first member and the third member, or the first member is positioned between the second member and the third member, and
while a load is applied to at least one of the first member and the second member to bring the second member into close contact with the surface of the first member, the supercooled state is maintained.

18. A supercooling release device that releases a supercooled state of a heat storage material, the supercooling release device comprising:
a first member having a concave portion on a surface thereof;
a second member facing the surface and covering the concave portion; and a cylinder housing the first member and the second member, wherein while a load is applied to at least one of the first member and the second member to bring the second member into close contact with the surface of the first member, the supercooled state is maintained.

* * * * *